(12) United States Patent
Witczak et al.

(10) Patent No.: US 12,498,448 B2
(45) Date of Patent: Dec. 16, 2025

(54) ANTI-HOPPING ALGORITHM FOR INDOOR LOCALIZATION SYSTEMS

(71) Applicant: Carrier Corporation, Palm Beach Gardens, FL (US)

(72) Inventors: Tadeusz Witczak, Farmington, CT (US); Bhavesh Patel, Woodstock, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 507 days.

(21) Appl. No.: 17/963,445

(22) Filed: Oct. 11, 2022

(65) Prior Publication Data

US 2023/0123804 A1 Apr. 20, 2023

Related U.S. Application Data

(60) Provisional application No. 63/255,542, filed on Oct. 14, 2021.

(51) Int. Cl.
*H04M 3/42* (2006.01)
*G01S 5/02* (2010.01)
*H04W 64/00* (2009.01)
*H04W 8/18* (2009.01)

(52) U.S. Cl.
CPC ......... *G01S 5/0295* (2020.05); *H04W 64/003* (2013.01); *G01S 2205/02* (2020.05)

(58) Field of Classification Search
CPC .... G01S 5/0295; G01S 2205/02; G01S 19/48; H04W 64/003; H04W 84/18; H04W 84/20; H04W 84/22; H04B 1/713
See application file for complete search history.

(56) References Cited

U.S. PATENT DOCUMENTS

| | | | | |
|---|---|---|---|---|
| 10,064,008 | B2* | 8/2018 | Park | H04W 40/244 |
| 10,389,402 | B1* | 8/2019 | Krohn | H04B 1/715 |
| 2005/0136845 | A1* | 6/2005 | Masuoka | H04B 17/27 |
| | | | | 455/67.14 |
| 2019/0174264 | A1* | 6/2019 | Kusens | G01S 5/02521 |
| 2019/0373460 | A1* | 12/2019 | Kilian | H04W 12/033 |
| 2019/0394636 | A1* | 12/2019 | Kilian | H04W 40/244 |

FOREIGN PATENT DOCUMENTS

WO WO-2016160376 A1 * 10/2016 ............... G01S 5/14

* cited by examiner

*Primary Examiner* — Wesley L Kim
*Assistant Examiner* — Erkin Abdullaev
(74) *Attorney, Agent, or Firm* — CANTOR COLBURN LLP

(57) ABSTRACT

A system and method for an anti-hopping algorithm for an indoor localization system. A method includes receiving a plurality of beacons, each of the plurality of beacons is received from a respective transmitter, pre-filtering the plurality of beacons to identify a subset of the plurality beacons that exceed a minimum signal threshold, and comparing a signal strength of each beacon of the subset to a strongest signal strength threshold of a currently assigned beacon. A method includes selecting a beacon from the subset, the selected beacon has been detected to exceed the strongest signal strength threshold of the currently assigned beacon a predetermined consecutive number of times, and assigning a location to the receiver, the location corresponds to a location of a transmitter of the selected beacon.

15 Claims, 3 Drawing Sheets ial Application No. 63/255,542 filed Oct. 14, 2021, the disclosure of

ANTI-HOPPING ALGORITHM FOR INDOOR LOCALIZATION SYSTEMS

CROSS-REFERENCE TO RELATED APPLICATIONS

This application claims the benefit of Provisional Application No. 63/255,542 filed Oct. 14, 2021, the disclosure of which is incorporated herein by reference in its entirety.

BACKGROUND

The present disclosure relates to localization systems, and more specifically, to an anti-hopping algorithm for indoor localization systems.

Building automation systems often require inputs from indoor localization systems to deliver location-based services or occupant-based controls to a user that is on location. Some building automation systems use beacon-based solutions to identify a location of a device to communicate with the system. Due to the timing of beacon messaging, simple Bluetooth low energy (BLE) systems are vulnerable to position hopping because the beacons may not be synchronized and/or continuously transmitted to a receiver. There may be a need to address the unnecessary position hopping or location reassignment of the devices operating in the BLE systems.

BRIEF DESCRIPTION

According to an embodiment, a method for performing the anti-hopping algorithm for indoor localization systems in accordance with one or more embodiments of the disclosure is provided. The method includes receiving, at a receiver, a plurality of beacons, wherein each of the plurality of beacons is received from a respective transmitter; pre-filtering the plurality of beacons to identify a subset of the plurality beacons that exceed a minimum signal threshold; and comparing a signal strength of each beacon of the subset to a strongest signal strength threshold of a currently assigned beacon. The method includes selecting a beacon from the subset, wherein the selected beacon has been detected to exceed the strongest signal strength threshold of the currently assigned beacon a predetermined consecutive number of times; and assigning a location to the receiver, wherein the location corresponds to a location of a transmitter of the selected beacon.

In addition to one or more of the features described herein, or as an alternative, further embodiments include performing the method in the receiver.

In addition to one or more of the features described herein, or as an alternative, further embodiments include responsive to selecting the beacon from the subset, verifying the location by comparing a strongest signal strength threshold to a zone signal strength.

In addition to one or more of the features described herein, or as an alternative, further embodiments include responsive to expiration of a period of time, subsequently selecting a beacon having a strongest signal strength, and updating the location of the receiver, wherein the updated location corresponds to a location of a transmitter of the subsequently selected beacon.

In addition to one or more of the features described herein, or as an alternative, further embodiments include detecting the selected beacon at least two consecutive times with a stronger signal than the beacon of the currently assigned location.

In addition to one or more of the features described herein, or as an alternative, further embodiments include prohibiting an update of the location of the receiver if the predetermined consecutive number of times is not reached.

In addition to one or more of the features described herein, or as an alternative, further embodiments include assigning the location of the receiver to at least one of an unknown location or a last known location, responsive to not receiving any beacons, and updating the location of the receiver using at least one of a global positioning system, an indoor localization system, or a building access system.

In addition to one or more of the features described herein, or as an alternative, further embodiments include assigning the location to the receiver for a period of time, wherein the period of time is greater than a beacon transmission rate of the transmitter of the selected beacon.

According to an embodiment, a system for performing the anti-hopping algorithm for indoor localization systems in accordance with one or more embodiments of the disclosure. The system for implementing an anti-hopping algorithm comprising comprises a memory, and one or more processors coupled to the memory for executing the anti-hopping algorithm. The processor is configured to receive signal strength data for a plurality of beacons, wherein each of the plurality of beacons is received from a respective transmitter; pre-filter the plurality of beacons to identify a subset of the plurality beacons that exceed a minimum signal threshold; and compare a signal strength of each beacon of the subset to a strongest signal strength threshold of a currently assigned beacon. The processor is further configured to select a beacon from the subset, wherein the selected beacon has been detected to exceed the strongest signal strength threshold of the currently assigned beacon a predetermined consecutive number of times; and assign a location to the receiver, wherein the location corresponds to a location of a transmitter of the selected beacon.

In addition to one or more of the features described herein, or as an alternative, further embodiments include executing the anti-hopping algorithm in the receiver.

In addition to one or more of the features described herein, or as an alternative, further embodiments include push the signal strength data to the transmitter; and perform the anti-hopping algorithm in the transmitter.

In addition to one or more of the features described herein, or as an alternative, further embodiments include selecting the beacon from the subset, verifying the location by comparing a signal strength threshold to a zone signal strength.

In addition to one or more of the features described herein, or as an alternative, further embodiments include responsive to determining an expiration of a period of time, subsequently select a beacon having a strongest signal strength; and update the location of the receiver, wherein the updated location corresponds to a location of a transmitter of the subsequently selected beacon.

In addition to one or more of the features described herein, or as an alternative, further embodiments include using a predetermined consecutive number of times comprises detecting the selected beacon at least two consecutive times with a stronger signal than the beacon of the currently assigned location.

In addition to one or more of the features described herein, or as an alternative, further embodiments include prohibiting an update of the location of the receiver if the predetermined consecutive number of times is not reached.

In addition to one or more of the features described herein, or as an alternative, further embodiments include assigning the location to the receiver for a period of time, wherein the period of time is greater than a beacon transmission rate of the transmitter of the selected beacon.

In addition to one or more of the features described herein, or as an alternative, further embodiments include selecting a strongest signal of the plurality of beacons and assign a location to the receiver, wherein the location corresponds to a location of a transmitter of the strongest signal when none of the plurality of beacons exceed a minimum signal threshold.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Advanced Bluetooth low energy (BLE) systems are expensive, complicated to install, and are often subscription-based systems. For controls and control systems, blue-dot precision is not required. Instead, the control systems may require a correlation to space to offer services to user devices in the area. Simple BLE beacon-based solutions can be used to identify the nearest beacon based on signal strength comparisons among a plurality of beacons received at the user device.

Because indoor localization systems simply use the strongest beacon signal for localization, the location of the receiver of a user device can quickly and unreliably hop or switch to the next location based on a single detection of the strongest signal strength. This can present an issue in scenarios where a receiver is located in an area that is between multiple zones where the signal strength of the strongest beacons is continuously changing.

The techniques described herein provide a sequence that enables a simple BLE beacon-based solution to eliminate the position hopping effect of a user device and deliver reliable indoor localization techniques to approximating the user device location.

Figure 1:
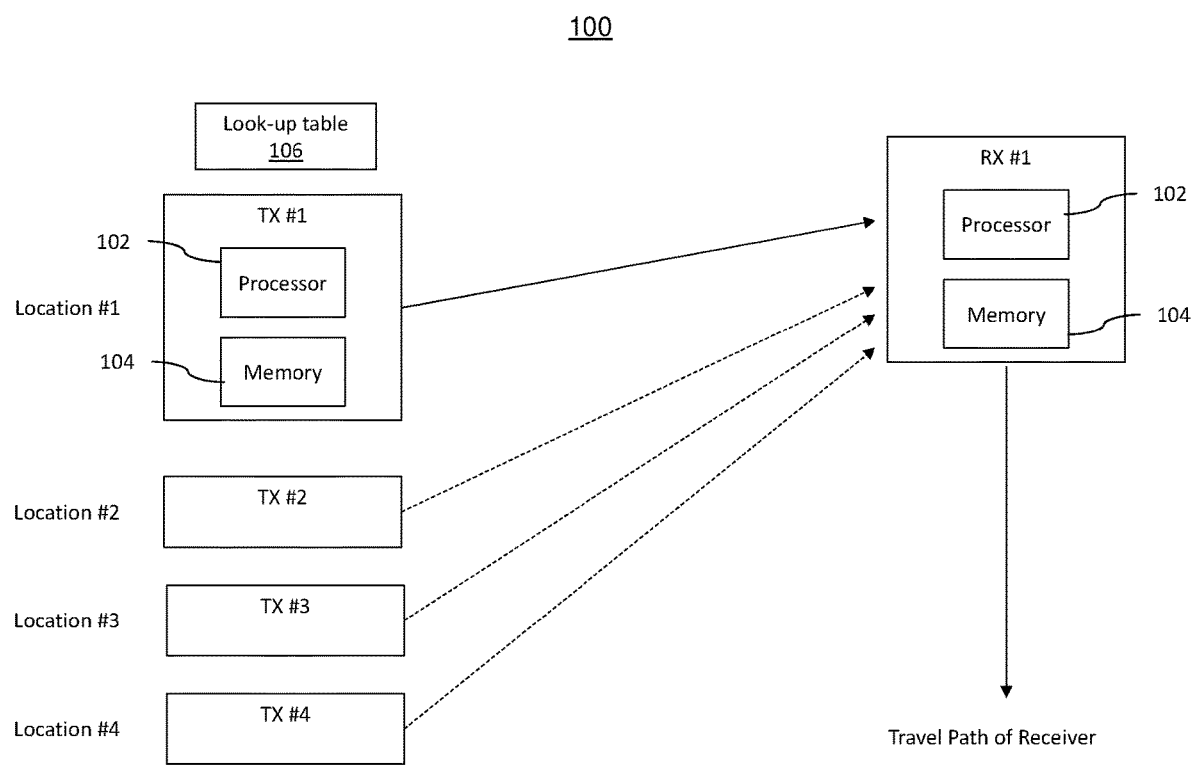
FIG. 1 illustrates an example system for implementing the anti-hopping algorithm for indoor localization system in accordance with one or more embodiments of the disclosure.

FIG. 1 depicts a system 100 for performing an anti-hopping algorithm for indoor localization systems. The system 100 can include a plurality of transmitters (TX #1, TX #2, TX #3, TX #4) that is configured to communicate with the receiver RX #1. The TX #1-4 are configured to periodically transmit messages to the RX #1. A plurality of beacons may be detected by the receiver at a location. The signals can range from short signals to long signals and can be transmitted at various frequencies/rates. The transmitters #1-4 and the receiver #1 can each include a processor 102 and memory 104 to carry out the operations for the anti-hopping algorithm. It can be appreciated the transmitters #1-4 and the receiver #1 can each include other components or modules and are not limited by the components shown in FIG. 1. In one or more embodiments of the disclosure, the processor 102 can include a processor 102 of a general-purpose computer, special purpose computer, or other programmable data processing apparatus configured to execute instruction via the processor of the computer or other programmable data processing apparatus. The memory 104 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), etc.).

TX #1-4 may be located in different zones or rooms of a building. The location of the transmitters can be discovered using a variety of techniques. In some embodiments, where transmitters are used having similar transmitting power capabilities, various signal strength thresholds, which can be correlated to a distance from the transmitter, can be assigned to identify or approximate the different locations in the area. The signal strength reading from each transmitter or a combination of signal strength readings from the transmitters can provide a mapping of locations that can be used to assign a location to a receiver. Other known techniques such as but not limited to triangulation which uses three nearby beacons to identify or approximate the different locations of a space. In some embodiments, the #1-4 may be located in the same space (e.g., lobby) or a defined zone in the space (e.g., the font desk of the lobby). For example, TX #1 can be located in the living room (location #1), TX #2 can be located in the kitchen (location #2), TX #3 can be located in a bedroom (location #3), and TX #4 can be located in the basement (location #4). The identifier and the location of each of the TX #1-4 can be stored in a look-up table 106. The look-up table 106 can be stored externally in a database that is assessable through a network or stored internally in the memory 104 of TX #1-4 or RX #1 and used to map the receiver's location to the location of the transmitter providing the beacon or message with the strongest signal as the receiver moves along a travel path as shown. After the location of RX #1 is determined by the system 100, various location-based services can be provided to the receiving device.

In one or more embodiments of the disclosure, a user device (not shown) can be configured with a BLE scanning application to detect beacons and approximate the location of the user device based on the detected signal strength of the beacons. The BLE scanning application can be configured to transmit the detected signal strength information to the transmitter for further analysis. In a different embodiment, the user device can perform the signal strength analysis to approximate the location of the user device.

Although only 4 transmitters and a single receiver is shown in FIG. 1, it can be appreciated that any number of transmitters and receivers implemented in the system 100 and be within the scope of the disclosure.

Figure 2:
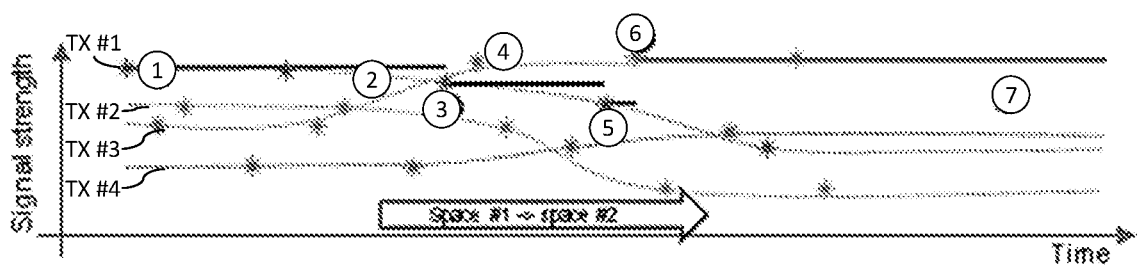
FIG. 2 illustrates a timing diagram for the system of FIG. 1 implementing the anti-hopping algorithm in accordance with one or more embodiments of the disclosure.
Figure 3:
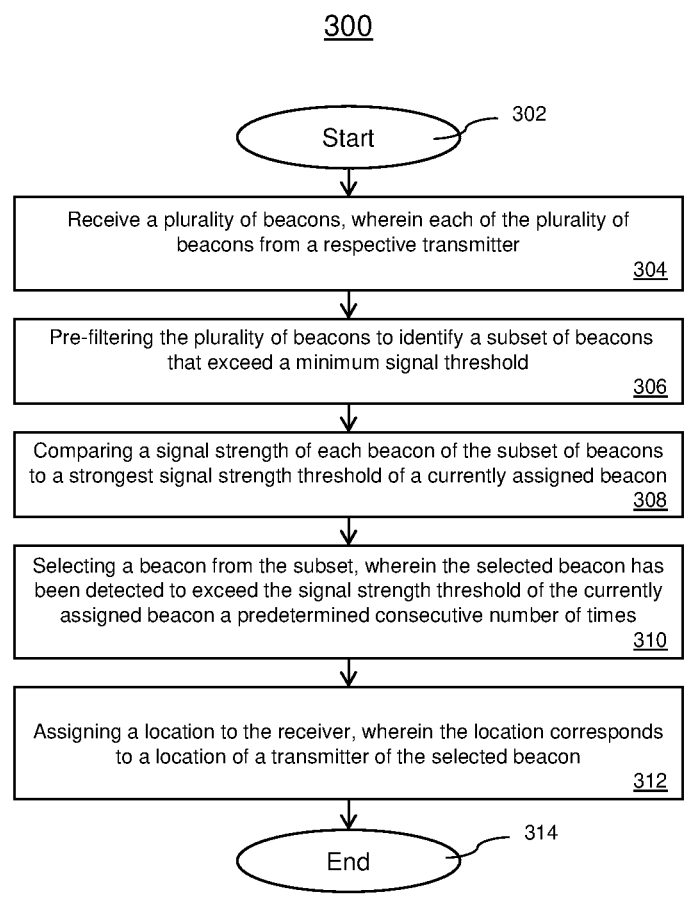
FIG. 3 illustrates a flowchart of a method for performing the anti-hopping algorithm for indoor localization systems in accordance with one or more embodiments of the disclosure.

FIG. 2 illustrates an example timing diagram 200 for beacons transmitted by TX #1-4 of the system 100 using the method 300 of FIG. 3 in accordance with one or more embodiments of the disclosure. The x-axis of the timing diagram 200 represents the time that has elapsed from the transmission of the beacons and the y-axis represents the detected signal strength at the receiver. The higher the value of the signal strength for the beacon or message the stronger the signal and alternatively, the lower the value the weaker the signal. The non-limiting example shown in FIG. 2 illustrates that the assigned location for RX #1 is held or extended for a period of time to maintain the location #1 as the receiver moves to location #2. The location is not immediately updated responsive to detecting the next strongest beacon. The solid line represents the currently assigned beacon and the dashed lines represent the plurality of other beacons that are detected at the receiver. At step 1, the current location assigned to RX #1 corresponding to the location of TX #1 is maintained. A strongest signal strength threshold can be stored for the signal strength corresponding to the strength of the beacons from TX #1. In one embodiment, the assigned location is not changed or updated until a predetermined number of stronger beacons or messages are consecutively detected by the RX #1. In another embodiment, the assigned location is not changed or updated until a hold timer corresponding to a configurable time period expires. In a non-limiting example, the time period may be configured based on the transmission rate of the transmitters TX #1-4 wherein the time period is longer than the transmission rate to allow at least one or more beacons to be transmitted. At step 2, as the receiver moves from Space #1 to Space #2, the RX #1 continuously detects the plurality of beacons, and the system 100 will maintain the currently assigned location for the receiver RX #1 until the criteria to change the currently assigned location is met. At step 3, the strongest signal strength threshold for the beacons from the transmitter TX #1 is adjusted. In this non-limiting example, the strongest signal strength threshold for RX #1 is reduced because RX #1 is still in communication with TX #1. As shown, the received signal strength of the currently assigned beacon is reduced, but the receiver maintains the communication and location corresponding to TX #1. At step 4, the beacon from TX #3 exceeds the signal strength of the currently assigned beacon of TX #1 for the first time. However, RX #1 does not immediately hop or switch to the other transmitter based on the first detection of a stronger beacon or message with a higher signal strength.

At step 5, the signal strength of the currently assigned beacon of TX #1 is further reduced which can indicate RX #1 is moving away from TX #1. In one or more embodiments, the strongest signal strength threshold is further reduced. The strongest signal strength threshold is maintained for the beacons corresponding to the assigned transmitter, in this case TX #1, until the transmitter and location assignment is changed. At step 6, the beacon from TX #3 is detected to be above the signal strength of the currently assigned beacon and the strongest signal strength threshold of TX #1 for a second time. This can indicate RX #1 is closer to the location of the transmitter TX #3 and since the signal strength has been exceeded by the beacon from transmitter TX #3 for a second consecutive time the location can now be updated to correspond to the location of transmitter TX #3. In one or more embodiments of the disclosure, the updated location information is updated and stored in the look-up table 106. It should be understood the predetermined number of consecutively detected beacons can be a configurable value. For example, to change the location, the system 100 can require 2, 5, 10, etc. number of consecutively received beacons. Also, the predetermined number can correspond to the rate at which the beacons are transmitted. For example, for transmitters and receivers that communicate at lower communication rates, the system 100 may require a lower predetermined number of consecutively received beacons while transmitters and receivers communicating at higher communication rate, the system 100 may require a higher predetermined number of consecutively received messages. In addition to updating the location of RX #1, the signal strength of the currently assigned beacon and the strongest signal strength threshold are also updated and the method continues to be executed as the RX #1 moves throughout the space. In the event stronger beacons are not consecutively detected from a transmitter, the receiver will maintain its current location assignment and no update of the location is performed until the criteria is met.

FIG. 3 illustrates a method 300 for implementing an anti-hopping algorithm for indoor localization system in accordance with one or more embodiments of the disclosure. The method 300 can be implemented in system 100 such as that shown in FIG. 1. The method 300 begins at block 302 and proceeds to block 304 receiving a plurality of beacons, wherein each of the plurality of beacons is received from a respective transmitter.

Block 306 continues the method, pre-filtering the plurality of beacons to identify a subset of the plurality beacons that exceed a minimum signal strength threshold. The minimum signal strength threshold is used to pre-filter or remove any beacons that do not exceed the minimum signal strength threshold. In one or more embodiments, the minimum threshold is a globally defined minimum level that all beacons must meet. Those beacons that do not meet the threshold are not considered for correlating the location of the receiver because the signals of the transmitter may be weak due to various factors such as distance to the receiver, signal interference, the transmitter may no longer be transmitting, etc. Block 308 compares a signal strength of each beacon of the subset to a signal strength threshold of a currently assigned beacon.

Block 310 selects a beacon from the subset, wherein the selected beacon has been detected to exceed the signal strength threshold of the currently assigned beacon a predetermined consecutive number of times. In other words, the communication with the transmitter and the location of the receiver is not changed or extended until multiple beacons are consecutively received at the user device. In one or more embodiments of the disclosure, the predetermined number comprises detecting the selected beacon at least two or more consecutive times with a stronger signal than the beacon of the currently assigned location. The system 100 prohibits the update of the location of the receiver if the predetermined consecutive number of stronger beacons is not received and further prevents the location and communication of the receiver from inadvertently hopping from one transmitter to the next based on a single detection of the highest signal.

In one or more embodiments of the disclosure, a zone threshold can be used to verify a location that may be at a border between a first location and a second location where a receiver is actually be present in a first zone but receives a stronger signal strength from a beacon of a neighboring transmitter. In such a scenario, the zone threshold can be configured to a configurable value to reliably indicate the approximate location of the receiver.

Block 312 assigns a location to the receiver, wherein the location corresponds to a location of a transmitter of the selected beacon. In one or more embodiments of the disclosure, the system 100 can assign the location to the receiver for a period of time, wherein the period of time is greater than a beacon transmission rate of the transmitter of the selected beacon. By configuring the period for the assignment in this fashion, the receiver is provided the opportunity to detect another beacon. In one or more embodiments of the disclosure, the identifier of the transmitter and the location of the transmitter can be stored in a look-up table. The receiver location can be approximated by using the identifier of the transmitter that the receiver is in communication with and looking up the location in the look-up table. The receiver location can then be associated with the location to provide various services (location-based services) to the user device. Subsequently, the receiver location can be updated as the receiver communicates with the other transmitters that may be located in other areas.

In one or more embodiments of the disclosure, if the system 100 determines the period of time as expired, a beacon having a strongest signal strength can be subsequently selected and the location of the receiver can be updated to correspond to the location of the transmitter with the strongest signal strength.

In a different embodiment, if no beacons are received during the period of time, the location of the receiver can be assigned to an unknown location or a last known location for the receiver. In another embodiment, the system 100 can access an external system such as but not limited to a global positioning system (GPS), another indoor localization system, or a building access system, to determine or assign the location to the receiver. For example, the system 100 may obtain the coordinates from the receiver that is equipped with GPS or corresponding a card swipe at an access location of a building management system that is associated with a receiver. The method 300 ends at block 314.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

The technical effects and benefits include providing a reliable indoor localization algorithm that is more resistant to unnecessary location changes based on a single detection of a stronger beacon.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for an anti-hopping algorithm for an indoor localization system, the method comprising:
   receiving, at a receiver, a plurality of beacons, wherein each of the plurality of beacons is received from a respective transmitter;
   pre-filtering the plurality of beacons to identify a subset of the plurality beacons that exceed a minimum signal threshold;
   comparing a signal strength of each beacon of the subset to a strongest signal strength threshold of a currently assigned beacon;
   selecting a beacon from the subset, wherein the selected beacon has been detected to exceed the strongest signal strength threshold of the currently assigned beacon a predetermined consecutive number of times, wherein the predetermined consecutive number of times is configurable based on the transmission rate of the beacons;
   maintaining a location of the receiver as corresponding to the currently assigned beacon for a configurable hold timer duration, wherein the hold timer duration is greater than the transmission rate of the beacons; and
   updating the location of the receiver, wherein the location of the receiver corresponds to a location of a transmitter of the selected beacon.

2. The method of claim 1, further comprising performing the method in the receiver.

3. The method of claim 1, further comprising responsive to selecting the beacon from the subset, verifying the location of the receiver by comparing the strongest signal strength threshold to a zone signal strength.

4. The method of claim 1, wherein the predetermined consecutive number of times comprises detecting the selected beacon at least two consecutive times with a stronger signal than the beacon of the currently assigned location of the receiver.

5. The method of claim 1, further comprising prohibiting the updating of the location of the receiver if the predetermined consecutive number of times is not reached.

6. The method of claim 1, further comprising assigning the location of the receiver to at least one of an unknown location or a last known location, responsive to not receiving any beacons, and
   updating the location of the receiver using at least one of a global positioning system, an indoor localization system, or a building access system.

7. The method of claim 1, further comprising selecting a strongest signal of the plurality of beacons and assigning a location to the receiver, wherein the location assigned to the receiver corresponds to a location of a transmitter of the strongest signal when none of the plurality of beacons exceeds a minimum signal threshold.

8. The method of claim 1, further comprising in response to no beacons received during a period of time, the location of the receiver is assigned to an unknown location or a last known location for the receiver.

9. A system for implementing an anti-hopping algorithm comprising:
   a memory;
   one or more processors for executing the anti-hopping algorithm, the one or more processors configured to:

receive signal strength data for a plurality of beacons, wherein each of the plurality of beacons is received from a respective transmitter;

pre-filter the plurality of beacons to identify a subset of the plurality beacons that exceed a minimum signal threshold;

compare a signal strength of each beacon of the subset to a strongest signal strength threshold of a currently assigned beacon;

select a beacon from the subset, wherein the selected beacon has been detected to exceed the strongest signal strength threshold of the currently assigned beacon a predetermined consecutive number of times, wherein the predetermined consecutive number of times is configurable based on the transmission rate of the beacons;

maintaining a location of the receiver as corresponding to the currently assigned beacon for a configurable hold timer duration, wherein the hold timer duration is greater than the transmission rate of the beacons; and updating the location of the receiver, wherein the location of the receiver corresponds to a location of a transmitter of the selected beacon.

10. The system of claim 9, wherein the one or more processors for executing the anti-hopping algorithm are located in the receiver.

11. The system of claim 9, wherein the one or more processors are configured to push the signal strength data to the transmitter; and perform the anti-hopping algorithm in the transmitter.

12. The system of claim 9, wherein the one or more processors are configured to select the beacon from the subset, verifying the location of the receiver by comparing a signal strength threshold to a zone signal strength.

13. The system of claim 9, wherein the predetermined consecutive number of times comprises detecting the selected beacon at least two consecutive times with a stronger signal than the beacon of the currently assigned location of the receiver.

14. The system of claim 9, wherein the one or more processors are configured to prohibit an update of the location of the receiver if the predetermined consecutive number of times is not reached.

15. The system of claim 9, wherein the one or more processors are configured to select a strongest signal of the plurality of beacons and assign a location to the receiver, wherein the location assigned to the receiver corresponds to a location of a transmitter of the strongest signal when none of the plurality of beacons exceed a minimum signal threshold.

* * * * *